United States Patent
Meyer

(10) Patent No.: US 9,548,852 B2
(45) Date of Patent: Jan. 17, 2017

(54) ANTENNA CROSS CONNECT SCHEME FOR LTE

(71) Applicant: COMMSCOPE TECHNOLOGIES, LLC, Hickory, NC (US)

(72) Inventor: Louis John Meyer, Shandy Shores, TX (US)

(73) Assignee: CommScope Technologies LLC, Hickory, NC (US)

( * ) Notice: Subject to any disclaimer, the term of this patent is extended or adjusted under 35 U.S.C. 154(b) by 0 days.

(21) Appl. No.: 14/842,518

(22) Filed: Sep. 1, 2015

(65) Prior Publication Data

US 2016/0072566 A1 Mar. 10, 2016

Related U.S. Application Data

(60) Provisional application No. 62/045,995, filed on Sep. 4, 2014.

(51) Int. Cl.
| | |
|---|---|
| H04B 1/44 | (2006.01) |
| H04L 5/14 | (2006.01) |
| H04B 7/04 | (2006.01) |
| H04B 1/00 | (2006.01) |
| H01Q 21/00 | (2006.01) |
| H01Q 1/24 | (2006.01) |

(52) U.S. Cl.
CPC . H04L 5/14 (2013.01); H04B 1/44 (2013.01); H04B 7/0413 (2013.01); H01Q 1/246 (2013.01); H01Q 21/0006 (2013.01); H04B 1/005 (2013.01)

(58) Field of Classification Search
CPC .... H01Q 1/246; H01Q 21/0006; H04B 1/005; H04B 7/0413; H04B 1/44; H04L 5/14
See application file for complete search history.

(56) References Cited

U.S. PATENT DOCUMENTS

| | | | | |
|---|---|---|---|---|
| 5,778,324 A | * | 7/1998 | Smith | H01Q 25/00 343/892 |
| 6,002,947 A | * | 12/1999 | Smith | H01Q 25/00 343/844 |
| 6,173,014 B1 | * | 1/2001 | Forssen | H04B 7/0845 375/267 |
| 6,339,703 B1 | * | 1/2002 | Otsuka | H01Q 21/29 455/269 |
| 7,659,859 B2 | | 2/2010 | Bisiules et al. | |
| 8,180,404 B2 | | 5/2012 | Han et al. | |
| 8,213,982 B2 | * | 7/2012 | Marlett | H01Q 1/243 455/552.1 |
| 8,988,308 B2 | * | 3/2015 | Jidhage | H01Q 1/246 342/368 |

(Continued)

OTHER PUBLICATIONS

Doumi "Spectrum Considerations for Public Safety in the United States", Jan. 2006, IEEE, pp. 30-37.*

(Continued)

*Primary Examiner* — Sophia Vlahos
(74) *Attorney, Agent, or Firm* — Myers Bigel, P.A.

(57) ABSTRACT

A radio and antenna combination with 4×N MIMO on the downlink path, with antenna arrays spaced 1 wavelength apart, and N×4 MIMO (or SIMO) on the uplink path, with 3 to 10 wavelengths or more separation of the antenna arrays.

18 Claims, 4 Drawing Sheets

(56) References Cited

U.S. PATENT DOCUMENTS

| | | | | |
|---|---|---|---|---|
| 2003/0139198 | A1* | 7/2003 | Johannisson | H01Q 1/246 455/525 |
| 2007/0099578 | A1* | 5/2007 | Adeney | H04B 7/0408 455/69 |
| 2009/0066595 | A1* | 3/2009 | Barker | H01Q 1/246 343/757 |
| 2009/0129299 | A1* | 5/2009 | Heuer | H04L 5/08 370/297 |
| 2011/0287771 | A1* | 11/2011 | Oyama | H04W 24/02 455/446 |
| 2012/0069780 | A1* | 3/2012 | Athley | H04B 7/0617 370/280 |
| 2013/0272437 | A1* | 10/2013 | Eidson | H04B 7/0413 375/267 |
| 2014/0233436 | A1* | 8/2014 | Long | H04B 7/0617 370/278 |
| 2014/0266936 | A1* | 9/2014 | Emmanuel | H01Q 9/42 343/725 |
| 2015/0255881 | A1* | 9/2015 | Bi | H01Q 1/246 343/853 |
| 2015/0357721 | A1* | 12/2015 | Zimmerman | H01Q 21/30 343/853 |
| 2016/0191227 | A1* | 6/2016 | Pagano | H04L 5/14 370/281 |

OTHER PUBLICATIONS

ECC Report 82 "Compatibility Study for UMTS Operating Within the GSM 900 and GSM 1800 Frequency Bands", May 2006, pp. 1-61.*

4G Americas "MIMO and Smart Antennas for MObile Broadband Systems", (2013).

* cited by examiner

ANTENNA CROSS CONNECT SCHEME FOR LTE

BACKGROUND OF THE INVENTION

Mobile wireless communications often rely on Base Station Antennas having phased arrays of multiple radiating elements to achieve desired beam shape, angle, and polarization. For example, a common Base Station Antenna may have a single column of dual-polarized radiating elements. This would be considered a two-port antenna. Other antennas may have additional arrays of radiating elements for additional bands to increase capacity. See, for example, U.S. Pat. No. 7,659,859 which is incorporated by reference.

Also, in mobile wireless systems there are two different radio frequency paths that may be optimized. The first is the Radio Frequency ("RF") path from the Base Station Antenna (BSA) to the user equipment (UE), and is referred to as the "downlink" path. The second is the RF path from the UE back to the BSA, and is referred to as the "uplink" path. For LTE applications, the downlink must typically support much higher data rates than the uplink. The reason for this is customer demand for features like streaming video and live TV.

The 3rd Generation Partnership Project (3GPP) Standards Body has defined Long Term Evolution (LTE) as the latest modulation scheme that the cellular industry can use, with the promise of much faster data speeds compared to legacy systems. In order to accomplish this, 3GPP has introduced a number of new concepts that are just beginning to be implemented. For example, with the E-UTRAN LTE 3GPP specifications, Multiple Input, Multiple Output (MIMO) transmission modes are defined.

MIMO transmission modes may be used in different ways. In one mode, transmit diversity may be achieved. In this example, each antenna array transmits the same information, and an increase in received power may be achieved. In other examples, different antenna arrays may transmit different streams of information. In this example, throughput is increased.

There are various MIMO configurations, typically delineated by the number of transmit antennas and by the number of receive antennas. For example, where a Base Station Antenna has four columns available for transmitting, and the User Equipment (UE) has two antennas for reception, the path from the path from the BSA to the UE is said to have 4×2 MIMO. One example of an antenna family suited to 4×N transmit MIMO is the CommScope SBNHH family, which has two columns of cross-polarized radiating elements for high-band signals, resulting in a four-port antenna for high band signals. The radiating elements are wide-band elements, configured to operate in a band of 1710-2360 MHz. The columns are spaced apart one wavelength or less.

SUMMARY OF THE INVENTION

In the subject invention, for the downlink path, it has been found that optimum spacing of antenna arrays in supporting the MIMO signals should be 1 wavelength ($\lambda$) or less apart. This results in optimum cell throughput. For example, in FIG. 1a, the normalized downlink (DL) bit rate for a 4×4 antenna configuration as a function of wavelength separation is illustrated. Figure 1b illustrates results from the 4×4 antenna configuration of the probability of a certain transmission rank as a function of the two dual-polarized antennas separation.

The uplink path has a different set of constraints. Usually high data rates are not the biggest issue, rather coverage is the bigger challenge. This difference comes from the fact that the base stations at the cell site transmit relatively high power of 20 to 60 watts while the battery powered UE devices transmit power on the order of 100 s of milliwatts.

To help improve uplink performance, 3GPP supports 4-way diversity consisting of 4 receiving antennas at the cell site. However, unlike the downlink path, it has been found that optimum uplink data rates are achieved when antenna arrays are spaced apart 3 to 10 wavelengths or greater. See FIG. 1c, which shows that in the uplink direction, the bit rate increased as the separation between the dual polarized antennas increases. Since all radios include duplexers, the connector ports typically carry both transmit (downlink) and receive (uplink) signals, so in legacy designs, the optimized downlink and uplink requirements cannot both be met simultaneously.

Moreover, simply adding additional receive diversity uplink antennas may not be possible. Each sector on most cell sites can only support a limited number of antennas due to zoning restrictions or physical tower loading constraints. In addition most operators are supporting LTE in several different frequency bands.

BRIEF DESCRIPTION OF THE DRAWINGS

The accompanying drawings which are incorporated in and constitute part of the specification, illustrate embodiments of the invention and, together with the general description of the invention given above, and the detailed description of the embodiments given below, serve to explain the principles of the invention.

DETAILED DESCRIPTION OF THE INVENTION

The example illustrated herein employs three North American frequency bands in the higher frequency range of 1710-2360-PCS, AWS and WCS. However, this same concept can be used for other frequencies and different numbers of bands.

Figure 1A:
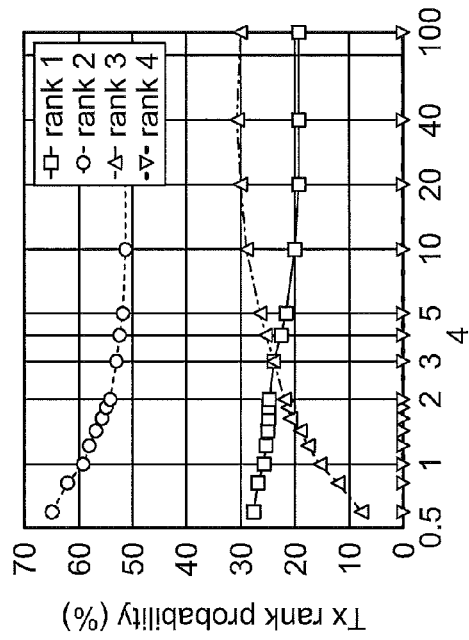
FIG. 1a, is a graph of downlink bit rates vs antenna separation.
Figure 1B:
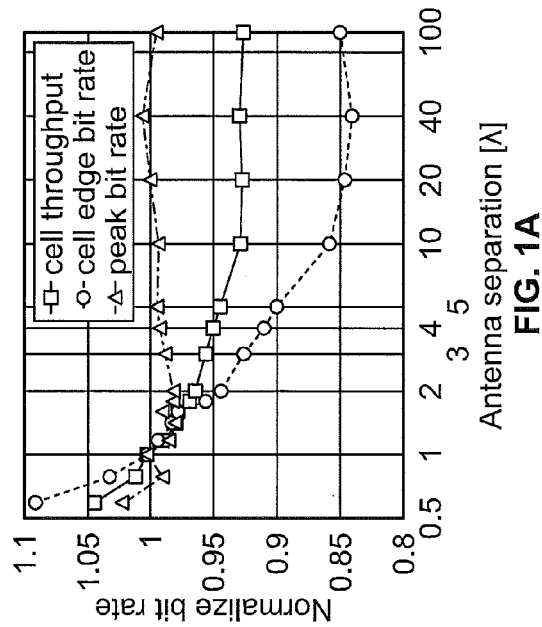
FIG. 1b is a graph of transmission rank as a function of antenna separation.
Figure 1C:
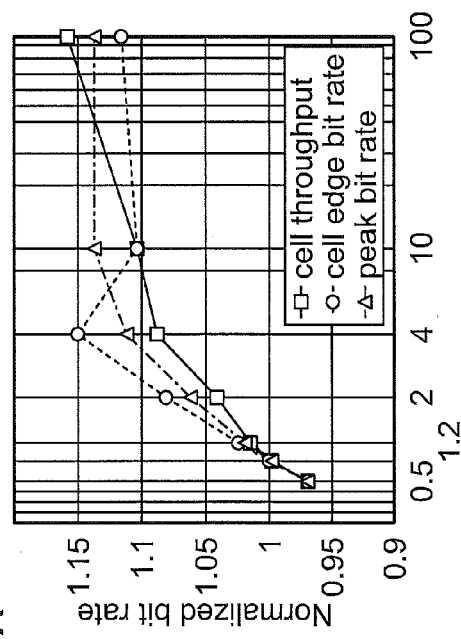
FIG. 1c is a graph of downlink bit rates vs antenna separation.
Figure 2:
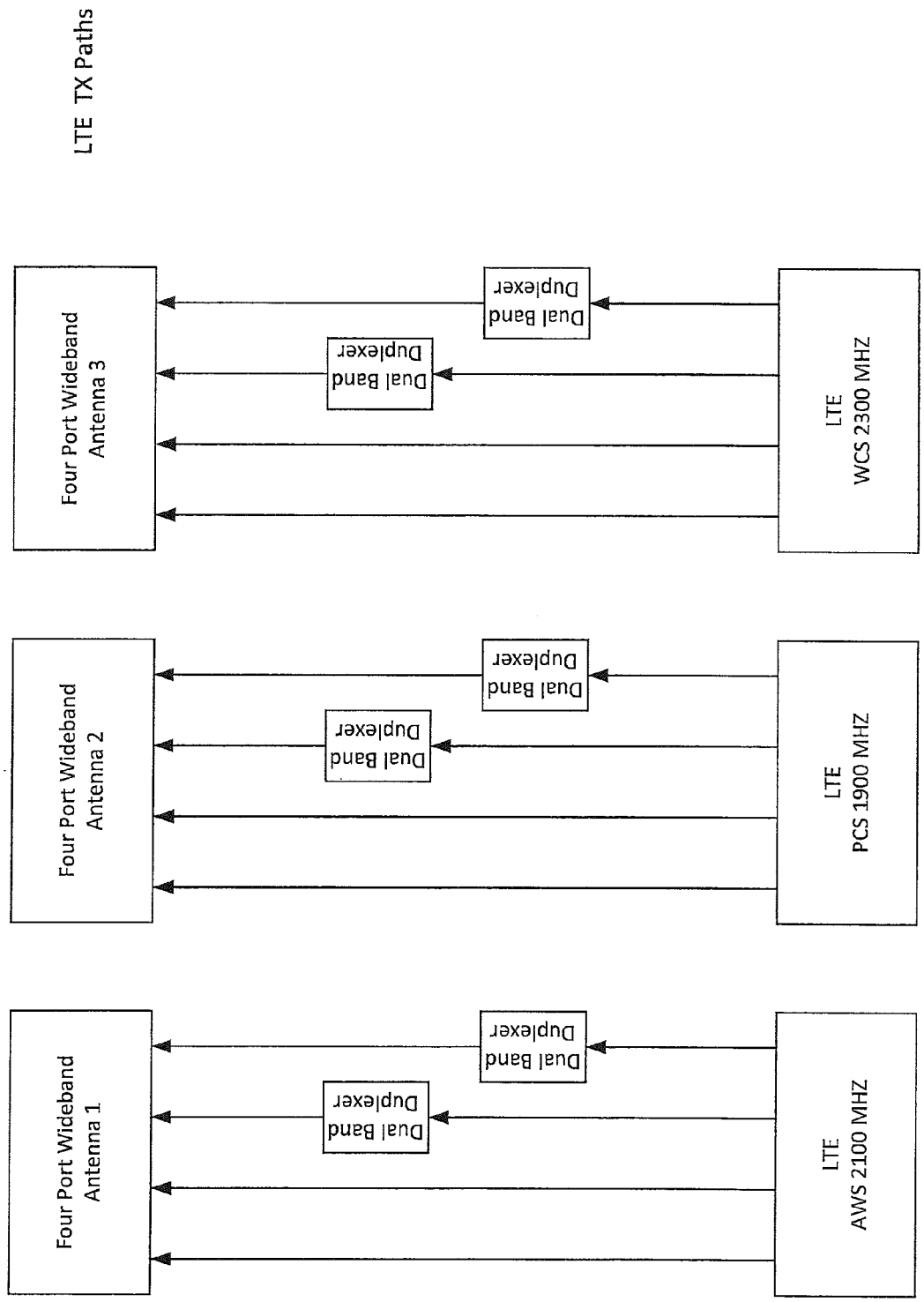
FIG. 2 is a schematic of the downlink couplings of radios and antennas according to the subject invention.

Referring to FIG. 2, transmit paths are shown for three, 4-port LTE radios and three 4-port antennas. In the transmit (downlink) path, each radio is coupled to a single, multi column antenna. Two of the ports are directly coupled, and two of the ports are coupled through a Dual Band Duplexer. The Dual Band Duplexers pass the transmit signals through to the antenna. See, FIG. 4 for additional detail regarding the Dual Band Duplexer. Thus, in the downlink direction, each radio is coupled to four arrays (two columns of cross-polarized radiating elements) where the spacing is optimized for 4×N MIMO transmission.

Figure 3:
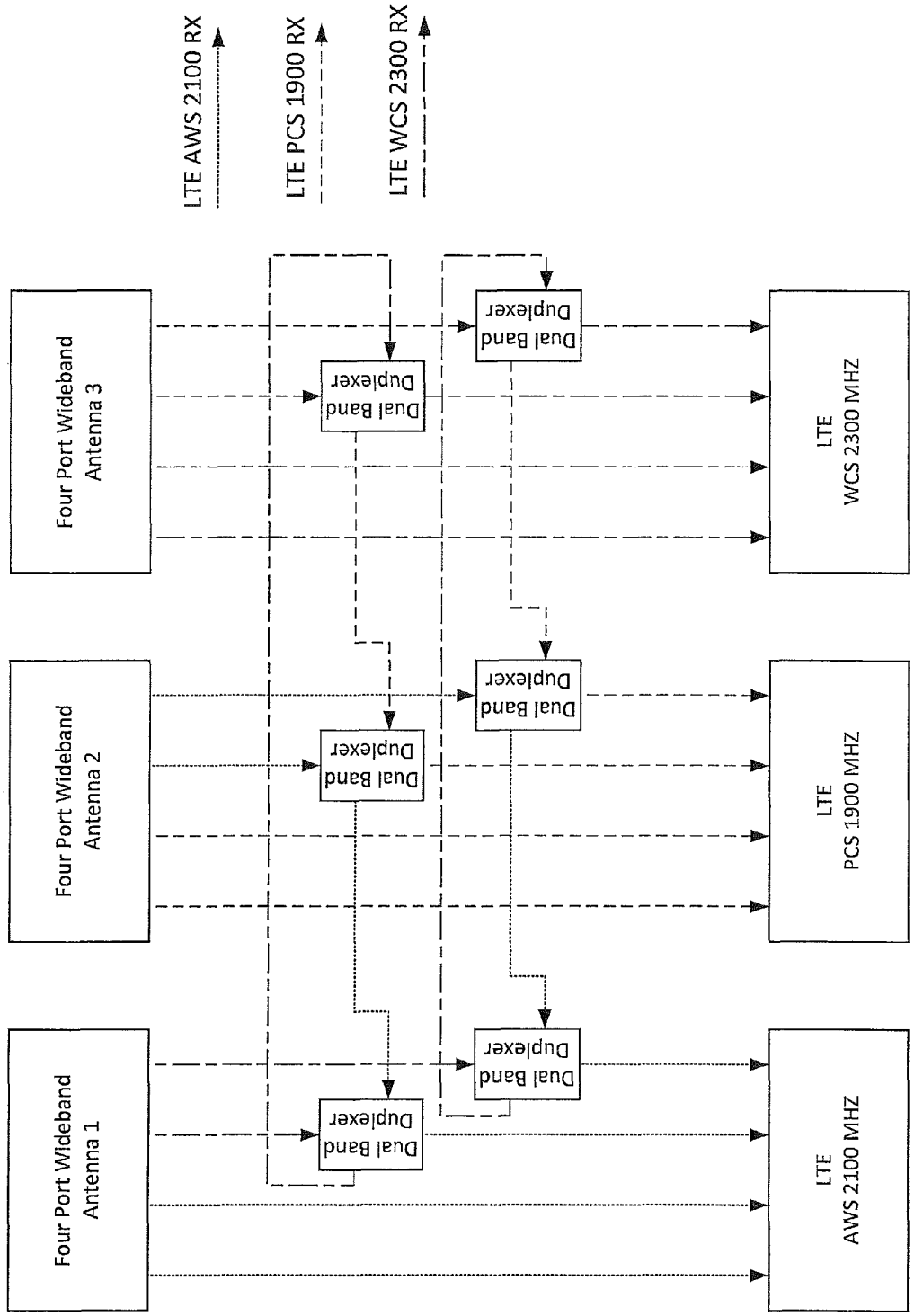
FIG. 3 is a schematic of the uplink couplings of radios and antennas according to the subject invention.

The receive (uplink) path configuration is illustrated in FIG. 3. Taking the LTE AWS 2100 MHz radio as an example, the two ports that were directly coupled to Antenna 1 on the transmit path are also directly coupled on the receive path. However, the two ports of the AWS 2100 MHz radio that are connected to the Dual Band Duplexers do not receive signals from Antenna 1, they receive signals from Antenna 2 via the Dual Band Duplexers.

Figure 4:
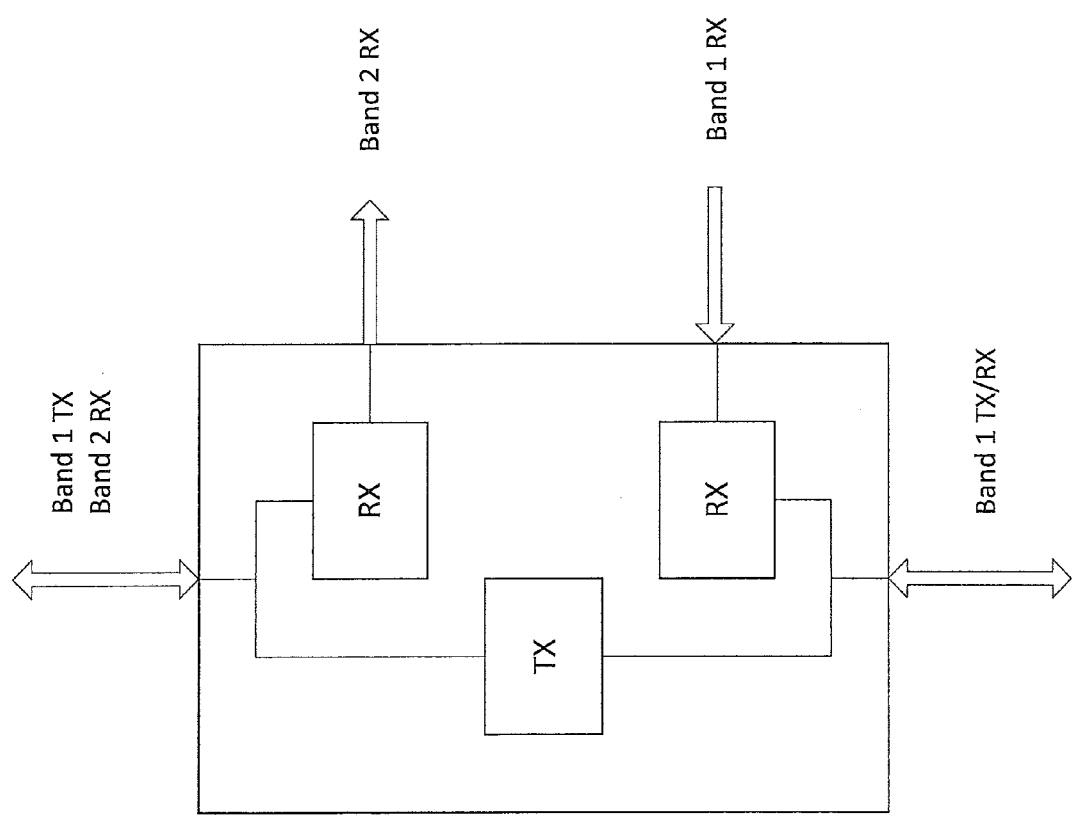
FIG. 4 is a schematic showing that the Band 1 signals pass unimpeded, but the Band 2 bypass to another radio.

With reference to FIG. 4, the Dual Band Duplexers are configured to pass the transmit Band 1 signals unimpeded, but redirect Band 2 receive signals from an antenna and bypass them to another radio. Also, the Dual Band Duplexer is configured to receive Band 1 receive signals from another antenna, and pass them to the Band 1 radio.

Each of the other radios is connected in a similar way. Antenna 1, Antenna 2, and Antenna 3 may be spaced apart as desired, e.g., four wavelengths apart, 10 wavelengths apart or more. Thus, on the uplink path, each radio receives signals from columns of radiating elements that are optimally spaced for the receive path, and each of the four port antennas receives signals destined for two different radios.

So configured, each radio and antenna combination results in 4×N MIMO on the downlink path, with antenna arrays spaced 1 wavelength apart, and N×4 MIMO (or SIMO) on the uplink path, with 3 to 10 wavelengths or more separation of the antenna arrays. Moreover, due to this shared use of antennas between radios operating in different bands, there is no need to install additional antennas on the cell tower to achieve optimal spacing for MIMO in both the uplink and downlink paths.

The invention claimed is:

1. A cellular antenna system, comprising:
   a first multi-port antenna;
   a second multi-port antenna;
   a first radio configured to transmit and receive signals in a first frequency band;
   a second radio configured to transmit and receive signals in a second frequency band, wherein the second frequency band is different from the first frequency band;
   a first dual band duplexer coupled to the first radio and a first port of the first multi-port antenna; and
   a second dual band duplexer coupled to the second radio and a first port of the second multi-port antenna,
   wherein the first dual band duplexer is configured to pass signals in the first frequency band from the first radio to the first multi-port antenna and signals in the second frequency band from the first multi-port antenna to the second radio via the second dual band duplexer, and
   wherein the second dual band duplexer is configured to pass signals in the second frequency band from the second radio to the second multi-port antenna and signals in a frequency band other than the second frequency band from the second multi-port antenna to a radio other than the second radio via the first dual band duplexer or another dual band duplexer other than the second dual band duplexer.

2. The cellular antenna system of claim 1, further comprising:
   a third multi-port antenna;
   a third radio configured to transmit and receive signals in a third frequency band, wherein the third frequency band is different from the first frequency band and the second frequency band; and
   a third dual band duplexer coupled to the third radio and a first port of the third multi-port antenna, wherein the third dual band duplexer is configured to pass signals in the third frequency band from the third multi-port antenna to the third radio and signals in the first frequency band to the first radio.

3. The cellular antenna system of claim 2, wherein the third frequency band is the frequency band other than the second frequency band and wherein the third radio is the radio other than the second radio.

4. The cellular antenna system of claim 1, further comprising a first direct connection between the first radio and a second port of the first multi-port antenna that does not include a duplexer.

5. The cellular antenna system of claim 1, wherein the first multi-port antenna and second multi-port antenna are spaced apart at a distance measured in wavelengths corresponding to a frequency of the first frequency band, wherein the distance is 3 to 10 wavelengths of the frequency.

6. The cellular antenna system of claim 1, wherein the first multi-port antenna comprises a plurality of columns of cross-polarized radiating elements.

7. The cellular antenna system of claim 6, wherein the plurality of columns of cross-polarized radiating elements are spaced apart at a distance of less than one wavelength of a signal having a frequency in the first frequency band.

8. The cellular antenna system of claim 6, wherein each cross-polarized radiating element comprises a wide-band radiating element configured to operate in a third frequency band comprising the first frequency band and the second frequency band.

9. The cellular antenna system of claim 1, wherein the first dual band duplexer is coupled to the second dual band duplexer.

10. An apparatus comprising:
    a dual band duplexer configured to be coupled to a first radio via a first port and to a multi-port antenna via a second port, wherein the dual band duplexer is configured to:
    pass a first signal within a first frequency band from the first radio and to the multi-port antenna via the second port;
    redirect a second signal within a second frequency band from the multi-port antenna toward a second radio via a third port, wherein the first frequency band is different from the second frequency band; and
    receive a third signal within the first frequency band via a fourth port and pass the third signal to the first radio via the first port.

11. The apparatus of claim 10, wherein the first frequency band comprises a frequency allocated to a Wireless Communications Service (WCS).

12. The apparatus of claim 11, wherein the second frequency band comprises a frequency allocated to a Personal Communications Service (PCS).

13. The apparatus of claim 10, wherein the dual band duplexer is configured to pass the first signal from the first radio to the multi-port antenna unimpeded.

14. The apparatus of claim 10, comprising the first radio and the multi-port antenna, and further comprising a direct connection between the first radio and the multi-port antenna that omits the dual band duplexer.

15. A method comprising:
    transmitting a downlink signal from a first radio via a first multi-port antenna comprising a plurality of radiating elements, wherein the downlink signal comprises a frequency in a first frequency band and wherein the first multi-port antenna and the first radio are connected via a first connection that includes a dual band duplexer and a second connection that omits the dual band duplexer;

receiving a first uplink signal via the first multi-port antenna, wherein the first uplink signal comprises a frequency in a second frequency band different from the first frequency band;

redirecting the first uplink signal to a second radio via the dual band duplexer; and receiving, by the first radio, a second uplink signal received at a multi-port antenna other than the first multi-port antenna and passed to the first radio via the dual band duplexer.

16. The method of claim 15, wherein the first multi-port antenna and the multi-port antenna other than the first multi-port antenna are spaced apart at a distance measured in wavelengths corresponding to the frequency of the first frequency band.

17. The method of claim 15, wherein each radiating elements of the plurality of radiating elements comprises a wide-band radiating element configured to operate in a third frequency band comprising the first frequency band and the second frequency band.

18. The method of claim 15, wherein redirecting the first uplink signal to the second radio via the dual band duplexer comprises passing the first uplink signal to another dual band duplexer.

* * * * *